(12) United States Patent
Lu et al.

(10) Patent No.: US 11,900,677 B2
(45) Date of Patent: Feb. 13, 2024

(54) USER-SELECTED MULTI-VIEW VIDEOCONFERENCING

(71) Applicant: Cisco Technology, Inc., San Jose, CA (US)

(72) Inventors: Hui-Ling Lu, Palo Alto, CA (US); Raul Alejandro Casas, Doylestown, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 50 days.

(21) Appl. No.: 17/681,045

(22) Filed: Feb. 25, 2022

(65) Prior Publication Data
US 2023/0274544 A1 Aug. 31, 2023

(51) Int. Cl.
| | |
|---|---|
| G06V 20/10 | (2022.01) |
| G06V 20/40 | (2022.01) |
| G06V 10/22 | (2022.01) |
| G06V 10/82 | (2022.01) |
| G06T 7/20 | (2017.01) |
| G06T 3/40 | (2006.01) |
| H04L 65/403 | (2022.01) |

(52) U.S. Cl.
CPC ............... G06V 20/41 (2022.01); G06T 3/40 (2013.01); G06T 7/20 (2013.01); G06V 10/225 (2022.01); G06V 10/235 (2022.01); G06V 10/82 (2022.01); G06T 2207/10016 (2013.01); H04L 65/403 (2013.01)

(58) Field of Classification Search
CPC ............................... G06V 20/41; G06V 20/10
See application file for complete search history.

(56) References Cited

U.S. PATENT DOCUMENTS

| | | | |
|---|---|---|---|
| 6,215,515 B1 | 4/2001 | Voois et al. | |
| 8,249,299 B1 * | 8/2012 | Dhawan | G06T 7/246 348/169 |
| 9,390,506 B1 * | 7/2016 | Asvatha Narayanan | G06T 7/194 |
| 2014/0313281 A1 | 10/2014 | Graff et al. | |
| 2014/0376609 A1 | 12/2014 | Barkley et al. | |
| 2015/0042748 A1 | 2/2015 | Tian et al. | |
| 2017/0237784 A1 | 8/2017 | Maistri et al. | |
| 2017/0374647 A1 | 12/2017 | Oyman | |
| 2018/0352089 A1 | 12/2018 | Garrido et al. | |

(Continued)

OTHER PUBLICATIONS

Allied Vision, "Multiple Regions of Interest," Application Note, V1.0.0, Jun. 2018, 7 pages.

(Continued)

*Primary Examiner* — Olisa Anwah
(74) *Attorney, Agent, or Firm* — Edell, Shapiro & Finnan, LLC

(57) ABSTRACT

Presented herein are systems and methods for generating a multi-view focused video stream. The methods involve obtaining at least one video stream of a first participant in an online video communication session between at least the first participant at a first endpoint and a second participant at a second endpoint; determining a bounding region of at least one element in the video stream; generating a focused video stream from the video stream that includes a focused view of the at least one element within the bounding region; and presenting the focused video stream on the second endpoint to at least the second participant.

20 Claims, 9 Drawing Sheets

(56) References Cited

U.S. PATENT DOCUMENTS

| | | |
|---|---|---|
| 2019/0037131 A1 | 1/2019 | Oyman et al. |
| 2019/0098347 A1 | 3/2019 | Chaugule et al. |
| 2019/0215484 A1 | 7/2019 | Power et al. |
| 2019/0306273 A1 | 10/2019 | Vismonte et al. |
| 2020/0201521 A1 | 6/2020 | Faulkner et al. |
| 2023/0099034 A1* | 3/2023 | Le .................. G06T 3/4053 375/240.01 |

OTHER PUBLICATIONS

Mavlankar, et al., "An Interactive Region-Of-Interest Video Streaming System for Online Lecture Viewing," https://web.stanford.edu/~bgirod/pdfs/MavlankarPacketVideo2010.pdf, Jun. 2010, 8 pages.

De Rivaz, et al., "AV1 Bitstream & Decoding Process Specification," https://aomediacodec.github.io/av1-spec/av1-spec.pdf, Jan. 2019, 681 pages.

Rex, "Computer-Based Teleconferencing Begins Migration into the Office," Communications News, https://www.thefreelibrary.com/_/print/PrintArticle.aspx?id=592487, Feb. 1985, 5 pages.

Acharya, "Design Of A Freeze-Frame Coder," Proceedings vol. 0757, Methods of Handling and Processing Imagery, Jun. 1987, 4 pages.

VC Warehouse, "Medical Video Conferencing," https://www.vcwarehouse.com/category-s/1907.htm, retrieved Aug. 2020, 3 pages.

Sequence Health, "Telehealth Services | Real-Time Online Patient Appointment," https://sequencehealth.com/our-solutions/telehealth-services, retrieved Aug. 1, 2020, 6 pages.

ITU, "Codec for Audiovisual Services AT n × 384 kbit/s," CCITT H.261, Series H: Audiovisual and Multimedia Systems, Coding of moving video, Reedition of CCITT Recommendation H.261 published in the Blue Book, Fascicle III.6, Nov. 1988, 14 pages.

ITU, "Video Codec for Audiovisual Services AT p × 64 kbit/s," Line Transmission of Non-Telephone Signals, ITU-T Recommendation H.261 (Previously "CCITT Recommendation"), Mar. 1993, 29 pages.

ITU, "Video coding for low bit rate communication," Series H: Audiovisual and Multimedia Systems, Infrastructure of audiovisual services—Coding of moving video, ITU-T Recommendation H.263 (Previously CCITT Recommendation), Feb. 1998, 167 pages.

ITU, "Advanced video coding for generic audiovisual services," Series H: Audiovisual and Multimedia Systems, Infrastructure of audiovisual services—Coding of moving video, Recommendation ITU-T H.264, Jun. 2019, 836 pages.

ITU, "High efficiency video coding," Series H: Audiovisual and Multimedia Systems, Infrastructure of audiovisual services—Coding of moving video, Recommendation ITU-T H.265, Nov. 2019, 712 pages.

ITL, "Versatile video coding," Series H: Audiovisual and Multimedia Systems, Infrastructure of audiovisual services—Coding of moving video, Recommendation ITU-T H.266, Aug. 2020, 516 pages.

GITHUB: "Mini-Project Exploring a Simple Image Saliency Detection System, Which Can then Feed into Further Image Processing Applications," retrieved from https://github.com/ivanred6/image_saliency_opencv, on Jun. 16, 2023, 9 pages.

Owl Labs, "Meeting Owl 3—360 Degree, 1080p HD Video Conference Camera," retrieved from https://owllabs.com/products/meeting-owl-3, on Jun. 16, 2023, 21 pages.

Playsight, "Sports AL and Automated Production Technology," retrieved from https://playsight.com/, on Jun. 16, 2023, 11 pages.

Samsung, "How to USE Multiview with Neo QLED," retreived from https://www.youtube.com/watch?v=qSj014W8ZEM, on Jun. 16, 2023, 3 Pages.

Varsheny, et al., "Transforming Noisy Low-Resolution into High-Quality Videos for Captivating End-User Experiences", NVIDIA Developer, Technical Blog, Sep. 21, 2021, 12 Pages.

Owl Labs, "The Whiteboard Owl from Owl Labs," YouTube, https://www.youtube.com/watch?v=-GnZ2qAYoto, Aug. 30, 2022, 2 pages.

Streamgeeks, "How to use the OBS Multiview," YouTube, https://www.youtube.com/watch?v=OWTVI5sOqN4, Jan. 28, 2019, 2 Pages.

Owl Labs, "Meeting Owl Pro Demo," YouTube, https://www.youtube.com/watch?v=k3EMsf9kusA, Nov. 15, 2021, 2 Pages.

Owl Labs, "The Whiteboard Owl from Owl Labs," retrieved from https://owllabs.com/products/whiteboard-owl, on Jun. 16, 2023, 13 pages.

Owl Labs, "Watch a Demo of the Whiteboard Owl," YouTube, https://www.youtube.com/watch?v=ZtL_yS2gGjg, Aug. 30, 2022, 2 Pages.

* cited by examiner

USER-SELECTED MULTI-VIEW VIDEOCONFERENCING

TECHNICAL FIELD

The present disclosure relates to video communication systems.

BACKGROUND

In recent years, video conferencing systems have gained popularity for a variety of uses including but not limited to virtual teaching. Existing video conferencing systems generally generate a single view of a meeting participant. However, this single view has proved ineffective in a variety of implementations, such as online meetings in which it is important for a user to simultaneously view a plurality of distinct portions of the single view, while maintaining each of the distinct portions in focus.

DESCRIPTION OF EXAMPLE EMBODIMENTS

Overview

Presented herein are systems and methods for generating a multi-view focused video stream. The methods involve obtaining a video stream (at least one video stream) of a first participant in an online video communication session between at least the first participant at a first endpoint and a second participant at a second endpoint; determining a bounding region of at least one element in the video stream; generating a focused video stream from the video stream that includes a focused view of the at least one element within the bounding region; and presenting the focused video stream on the second endpoint to at least the second participant.

Example Embodiments

Figure 1:
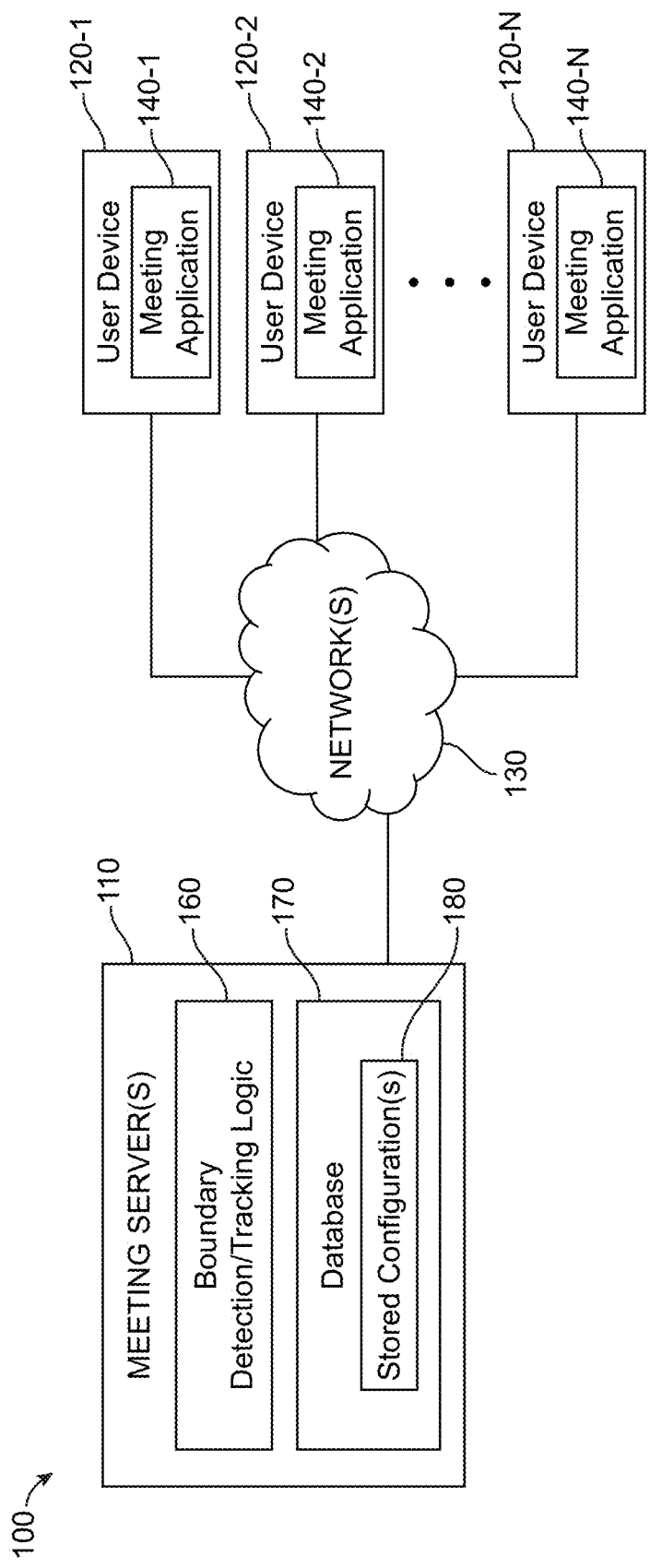
FIG. 1 is a block diagram of a system configured to provide one or more multi-view communication sessions among a plurality of participants, according to an example embodiment.

Reference is first made to FIG. 1. FIG. 1 shows a block diagram of a system 100 configured to provide online meeting services that facilitate the display of multiple focused views of an input video stream. The system 100 includes meeting server(s) 110 and a plurality of user devices 120-1, 120-2, to 120-N that communicate with meeting server(s) 110 via one or more networks 130. The meeting server(s) 110 may be configured to provide an online meeting service for hosting a communication session among user devices 120-1 to 120-N. In some implementations, the meeting server(s) 110 are configured to receive an input video signal and generate multiple focused views to improve a user experience, especially in communication sessions involves multiple regions of interest.

The user devices 120-1 to 120-N may be tablets, laptop computers, desktop computers, Smartphones, virtual desktop clients, video conference endpoints, or any user device now known or hereinafter developed that can run a meeting client, such as meeting applications 140-1, 140-2, to 140-N, or similar communication functionality. The user devices 120-1 to 120-N may have or be coupled to audio and video input devices such as, e.g., a camera and microphone. The user devices 120-1 to 120-N may have a dedicated physical keyboard or touch-screen capabilities to provide a virtual on-screen keyboard to enter text. The network(s) 130 may include wired local and wide-area networks as well as wireless local and wide-area networks. The user devices 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

The meeting server(s) 110 may include boundary detection/tracking logic 160 and a database 170, which may further include stored configuration(s) 180. In another embodiment, the functions of the boundary detection/tracking logic 160 are executed by a user device by a multi-view recommender system functionality that is executed as part of an associated meeting application, as described further below in connection with FIG. 2. Similarly, in the embodiment shown in FIG. 1, the database 170 containing stored configuration(s) 180 is included in the meeting server(s) 110, in an alternative embodiment, such component(s) may be included in at least one of the meeting applications 140-1 to 140-N. In some embodiments, these functions may be divided across the meeting server(s) 110 and the meeting application.

In one embodiment, the boundary detection/tracking logic 160 is configured to detect recognizable aspects of an input video stream. A "recognizable aspects" of an input video stream may include, e.g., a person (a person in general or a specific person); body parts of the person (body, head, eyes, torso, hands, arms, feet, legs, etc.); or objects (instruments, parts of an instrument, sports equipment, pots/pans, food ingredients, etc.). For simplicity, any such "recognizable aspect" may be referred to herein as an "object," regardless of whether such recognizable aspect is a person, animal, insect, plant, or other physical thing that may not traditionally be classified as an "object." Instead of or in addition to automatic detection of an object, an object may be detected using input data associated with a user manually designating an object.

Additionally, the boundary detection/tracking logic 160 may be configured to automatically generate a bounding region for an object. A bounding region of an object may generally refer to a smallest possible sub-section of an input video stream that still includes the object of interest. The shape of the bounding region may be geometric (e.g., rectangular or circular) or may resemble an outline or contour of the object of interest. Instead of or in addition to automatic generation of bounding regions, a bounding region may be generated using input data associated with a user manually drawing or otherwise indicating the bounds of a bounding region. The boundary detection/tracking logic 160 may use the bounding region to generate a focused view of the object of interest from a video stream obtained from a camera associated with a user device, e.g., one of the user devices 120-1 to 120-N.

Also, the boundary detection/tracking logic 160 may be configured to automatically track an object of interest. For example, when the size/position of the object itself changes or the relative distance/position between the object and the camera change, the object may change in size/position as displayed from the input video stream. The automatic boundary detection/tracking logic 160 may be configured to modify the size or shape of the bounding region in real time such that the bounding region continuously maintains an appropriate size and shape to bound the object of interest.

The boundary detection/tracking logic 160 may further store, retrieve, and use one or more stored configuration(s) 180, which may be associated with a predefined classification of the input video stream. Example classifications may include, e.g., a guitar lesson, a cooking lesson, a yoga instruction, a band performance, a specific surgical procedure, specific machine repair instructions, or any other conceivable classification of an input video stream now known or later developed. The stored configuration(s) 180 may be used to accurately detect and track specific objects that may be known or typical for the associated classification. For example, if the stored configuration has the classification of guitar lesson, the boundary detection/tracking logic 160 may be configured to search for, detect, and track at least a guitar, the hands of the guitarist, the head of the guitarist, and other objects that may be known to be used or typically used in guitar lessons. Computer vision techniques such as, e.g., computer vision techniques that include a library of object models tailored for particular stored configuration(s) 180 may be used. In addition to or in the alternative to computer vision techniques, machine learning, neural network, and/or artificial intelligence techniques may be used in conjunction with the stored configuration(s) 180 and/or boundary detection/tracking logic 160.

At a high level, the techniques presented herein involve various approaches to transform an input video stream (obtained from a single video camera) into two or more focused views that are presented to an end user. The end user's experience is enhanced because the end user is provided clear, stable, and in some cases enlarged views of specific objects that the focused views track. In addition, the techniques presented herein involve ways to process the input video stream to automatically detect and suggest objects, which the user may select, to be included in focused views. The techniques presented herein further involve a fully automatic approach of detecting and selecting objects of interest, which are then tracked and displayed as multiple focused views.

Figure 2:
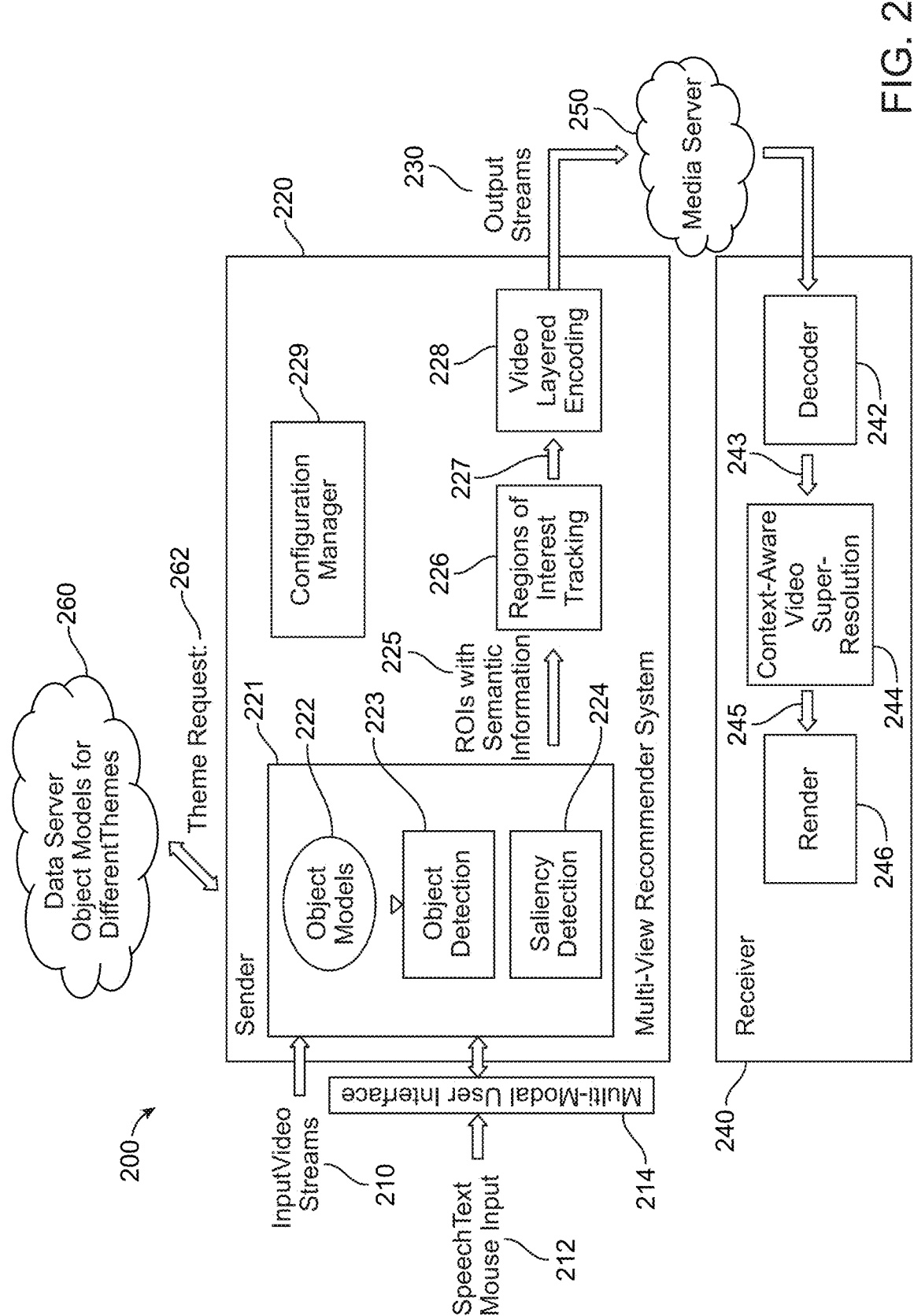
FIG. 2 is a diagram depicting a method of generating a multi-view focused video stream of a single participant, according to an example embodiment.

Reference is now made to FIG. 2, with continued reference to FIG. 1. FIG. 2 is a diagram depicting method 200 of generating of a multi-view focused video stream, according to an example embodiment. The method 200 may be performed by two or more of the meeting applications 140-1 to 140-N of FIG. 1. For example, one of the meeting applications 140-1 to 140-N may be configured to perform the functions of a sender module 220, and another one of the meeting applications 140-1 to 140-N may be configured to perform the functions of a receiver module 240. However, it is understood that each meeting application 140-1 to 140-N may include and be configured to execute operations of the sender module 220 and the receiver module 240, depending on the rule of the associated user device during a given video communication session. The sender module 220 and receiver module 240 may both be in communication with a media server 250 (which corresponds to the meeting server(s) 110 shown in FIG. 1). The sender module may include a multi-view recommender system (MVRS) 221, a regions of interest tracking component 226 and a video layered encoding component 228. The MVRS 221 may further include an objects models sub-component 222, an object detection sub-component 223, and/or a saliency detection sub-module 224. The receiver module 240 may include a decoder 242, a context-aware video super-resolution component 244, and a render component 246.

In one embodiment, the method 200 includes one or more input video streams 210 being input to the MVRS 221 of the sender module 220. Additionally, at least one of speech, text, or mouse input data 212 may be received by a multi-modal user interface 214, which may be in bi-directional communication with the MVRS 221. While the speech, text, or mouse input data 212 includes input data from at least one of a microphone, keyboard, and mouse, a person having ordinary skill in the art would understand that other forms of input data, such as input data from a touch screen interface or input data from gestures of a wearable device, may be used in addition to or instead of input data from the microphone, keyboard, and/or mouse. The multi-modal user interface 214 may be configured to receive and interpret user commands, which may be in the form of audio, text, clicks, taps, etc., and transmit information associated with the user commands to the MVRS 221. The MVRS 221 may use the user command information in a variety of ways depending on configuration of the system, as further described below with respect to FIGS. 4A, 4B, and 4C.

The MVRS 221 may be configured to process one of the input video streams 210 using the object models sub-component 222 and/or object detection sub-component 223 to provide suggested views of the video stream. The object models sub-component 222 may use a computer-vision-based object recognition module, which may further use prebuilt common object recognition models. The suggested views of the video stream may be provided to a user at or near the beginning of a meeting session. If the meeting session pertains to a music lesson for example, the computer-vision-based object recognition module of the MVRS 221 may use prebuilt common object recognition models that particularly focus on human body parts and commonly used objects associated with the human body parts such as musical instruments.

The MVRS 221 may be in bi-directional communication with a data server 260, which may include object models for different themes. In one embodiment, the MVRS 221 may submit a theme request 262 to the data server 260, and the data server 260 may respond with theme data corresponding to the theme request 262. The MVRS 221 may use various theme information to support a variety of end-user applications, which may each have different visual contexts. Each theme may include a different composition of objects that the MVRS 221 may use in object detection and view suggestion.

The saliency detection sub-module 224 of the MVRS 221 may execute a context-dependent saliency detection algorithm that may detect regions of interest without resorting to target object models. As such, the saliency detection sub-module 224 may be configured to detect objects that do not have prebuilt object-recognition models. In an embodiment in which the meeting session is a music lesson, if a student in the input video stream is playing a specialized instrument that is not included in one of the object models stored in the objects models sub-component 222, the MVRS 221 may suggest to the user that the unknown instrument, which may be held in the student's hand(s), to be within a region of interest based on context-aware saliency detection. In addition, the saliency detection sub-module 224 may be configured to recognize motion patterns in a video stream, such as motion patterns in the foreground of a video stream that may represent a focal point of the video stream.

In one embodiment, after a computer-vision-based object recognition module having prebuilt common object recognition models detects an object and/or the saliency detection sub-module 224 detects an object that does not have a prebuilt object-recognition model, the MVRS 221 may suggest or recommend to the user such objects, in order for the user to verify whether such objects should be within a region of interest. The user may in turn interact with the multi-modal user interface 214 to indicate that all or a subset of such objects are to have an individual view.

The multi-modal user interface 214 with which a user may interact may provide an intuitive mechanism for user-selection of views of interest. For example, the multi-modal user interface 214 may provide the user an ability to select a view of interest via mouse click, touch-screen tap, voice command, text input, etc. The MVRS 221 may include a natural language processing module (not shown) to extract a semantic meaning of the audio/text input data, and the MVRS 221 may associate the audio/text input data with a theme or with existing computer-vision models of the MVRS 221. In one embodiment, the multi-modal user interface 214 may be configured to receive multi-modal input, which may be inputs from different modalities fused together to provide user preferences to the recommender system.

In one embodiment, a configuration manager 229 may be used to configure future meetings. The configuration manager 229 may store and automatically use view selection preferences from a previous meeting for future meetings that include the same participants included in the previous meeting. For example, if the same participants conduct another meeting, the view selection preferences from the previous meeting may be automatically restored. Alternatively, the configuration manager 229 may provide a user with an ability to save system configuration preferences for different meetings. The user may thus easily choose from a variety of stored configuration preferences that may be tailored for specific circumstances. Another benefit is that if the user conducts a meeting with a new participant, i.e., a participant with which the user has not previously conducted a meeting, the user may easily select and use one of the stored configuration preferences for the meeting with the new user.

With or without a specific configuration preference, the MVRS 221 may be configured to use one or both of object detection and saliency detection techniques to generate and transmit regions of interest data 225 to a regions of interest tracking component 226. The regions of interest data 225 may include regions of interest corresponding to objects, each of which may be associated with semantic information using the techniques described above. Each region of interest may be associated with a view of the object within the region of interest. The regions of interest tracking component 226 may include a view-tracking system that tracks one or more views, which may have been selected/verified by a user, and the view-tracking system may include a real-time tracking system that generates data relating to a stable visual appearance of each view. The regions of interest tracking component 226 then outputs data 227, which may include multi-view videos, to the video layered encoding component 228.

The video layered encoding component 228 may use a layer coding implementation to encode the multi-view videos to multiple video streams, which allows decompression even if some layers are missing. Accordingly, the video layered encoding component 228 provides for a more reliable and robust system.

The method 200 further includes the video layered encoding component 228 encoding the data received from the regions of interest tracking component 226. The encoded output streams 230 may be communicated to a media server 250 then communicated to the decoder 242 of the receiver module 240. The decoder 242 may be configured to decode the encoded output streams and transmit the decoded output streams 243 to the context-aware video super-resolution component 244 of the receiver module 240.

The context-aware video super-resolution component 244 may use a video super-resolution system that generates high-resolution video frame data 245 from the relatively lower resolution decoded output streams 243 received from the decoder 242. In one embodiment, the MVRS 221 may provide the context-aware video super-resolution component 244 with context information such that the video super-resolution system may use an appropriate model to address the particular interpolation scheme for a given region of interest, which may have a specific object type and specific motion pattern. In other words, the video super-resolution system may be optimized in that the model it uses is based on the provided context information, and the resulting output is high-resolution video frame data 245 for each region of interest, which is provided to the render component 246. The render component 246 may be configured to render the high-resolution video frame data 245 such that the high-resolution video may be displayed on a display.

Figure 3:
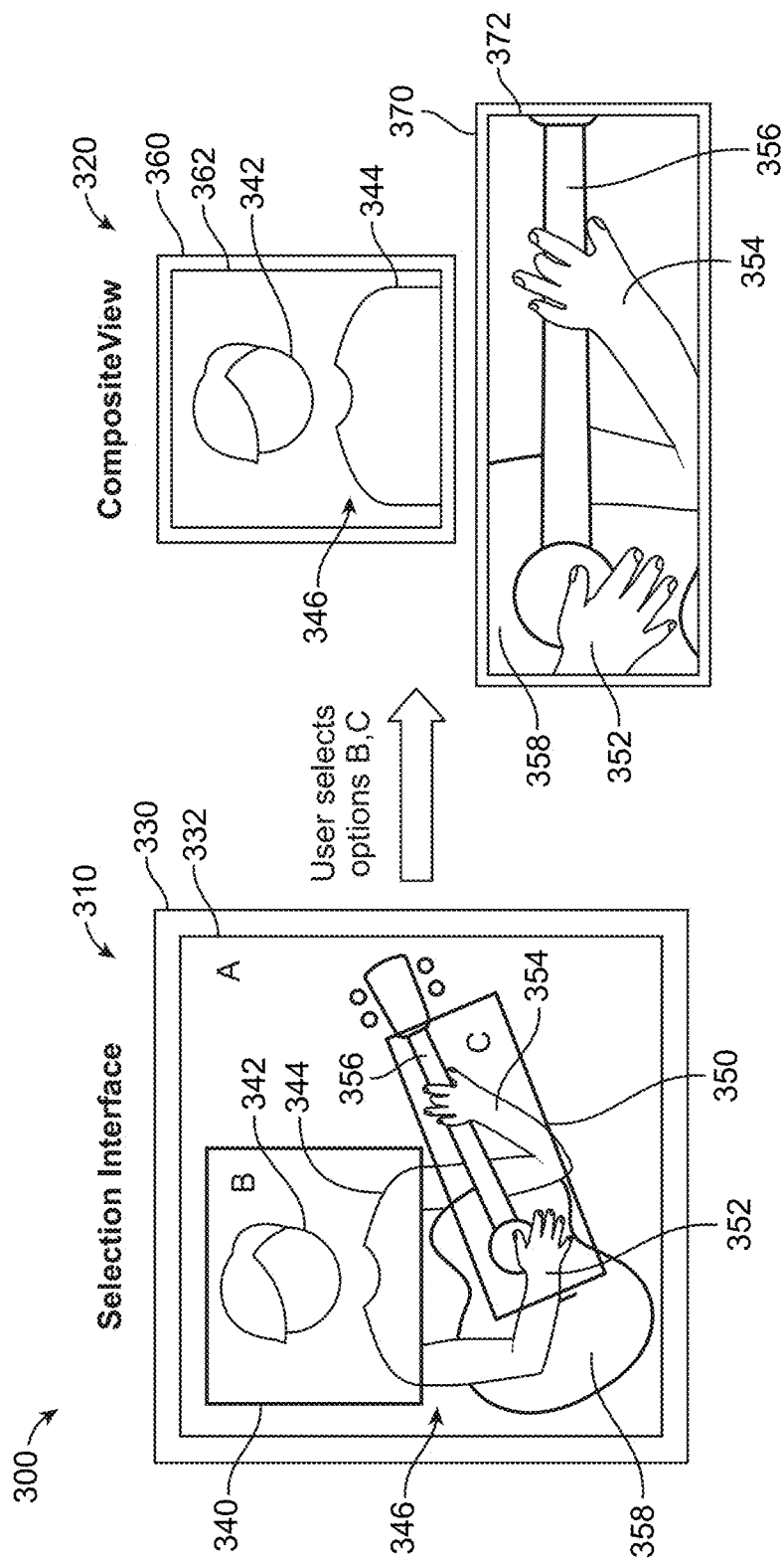
FIG. 3 illustrates an example user interface that includes bounding regions of an input video stream and a composite view including multiple focused views corresponding to the bounding regions, according to an example embodiment.

FIG. 3 illustrates an example of a user interface 300, which includes a selection interface 310 and a composite view 320. The user interface 300 may be presented to a user on a user device to allow that user to request and receive a focused video stream from a far end user during a video communication session. It is also possible that the user interface 300 may be presented to a user on a near end to select a focused video stream to be send to a far end user. The selection interface 310 may include a selection interface frame 330 configured to display an input video stream 332. Within the input video stream, there may be a first bounding region 340 and a second bounding region 350. In this particular embodiment, the first bounding region 340 bounds the head 342 and shoulders 344 of a guitarist 346, and the second bounding region 350 bounds a right hand 352 and a left hand 354 of the guitarist 346 as well as a neck 356 of a guitar 358. The manner in which these bounding regions may be created is described below in connection with FIGS. 4A, 4B, and 4C.

The composite view 320, in this embodiment, includes a first composite view frame 360 and a second composite view frame 370. The first composite view frame 360 includes a first focused view 362, which is a focused view of the first bounded region 340, and the second composite view frame 370 includes a second focused view 372, which is an enlarged and focused view of the second bounded region 350. In one embodiment, a user may be presented with a first option A, a second option B, and a third option C, which respectively correspond to the entire input video stream 332, the first bounding region 340, and the second bounding region 350. In this embodiment, the user has selected the second option B and the third option C, and thus the composite view has focused views of the first bounding region 340 and the second bounding region 350. As further noted below with respect to FIG. 4C, in alternative embodiments, the user may not be prompted to or required to select options corresponding to the desired focused views, and the system may automatically generate bounding regions and corresponding focused views without user selection.

An embodiment in which a guitar teacher conducts a lesson with a student via an online video communication session (e.g., meeting) is discussed for sake of example. The guitar teacher may be using one of the user devices 120-1 to 120-N and the student may use another one of the devices 120-1 to 120-N. At the beginning of the video conference, either the student or the teacher may select from the selection interface 310 bounding regions from within their own input video stream or the other person's input video stream. In one embodiment, the teacher or student may draw a bounding region for each to-be-generated focused view. In an instance in which the teacher wishes to observe the student, the teacher may ask the student to play the guitar, and the teacher may then draw one or more boundary regions around objects that the teacher wishes to watch in the teacher's video feed. In the alternative, the system may be configured to automatically provide bounding regions of supported or recommended views of the student that the teacher may select. For example, the system may be configured to automatically generate bounding regions around each of the student's hands, around the student's entire guitar, around the student's torso, or around the student's head. In the exemplary embodiment shown in FIG. 3, the first bounding region 340 includes the student's head and shoulders, and the second bounding region 350 includes the student's two hands and the neck of the student's guitar. Alternatively to or in addition to the teacher being able to select the views that the teacher wishes to view, the student may also be able to select the views that the student wishes to view.

In another embodiment, the system may be configured to permit the student to select views that the teacher receives and views. However, the student may experience difficulty in drawing or selecting bounding regions in his or her own video stream. For example, in a student-teacher guitar lesson, the student may be unable to use his or her hands to interact with a mouse or touchscreen to draw or select the bounding regions because one or both of the student's hands would have to be removed from the proper position on the guitar to perform such interaction. If a bounding region is drawn or selected while one or both of the student's hands is not in the proper position on the student's guitar, such drawn/selected bounding region may fail to place bounds around the student's hand(s) as generally desired in this embodiment.

To overcome this, the view selection system may include a verbal command interface to which the student may provide verbal commands. In one embodiment, the view selection system is configured to receive a verbal command to initiate a view selection process. For example, the view selection system may be configured to capture and present to the student a still image of the student's input video stream when the student speaks a verbal command, such as "System, take a snapshot." Subsequently the student may draw (or otherwise indicate) bounding regions on the snapshot for each desired view that is to be displayed to the teacher. In the alternative, the view selection system may generate automatic bounding region recommendations using the snapshot and the above-noted techniques. The view selection system may be configured to display the automatically generated bounding regions to the student as recommended bounding regions, and the student may select which of the recommended bounding regions, if any, that the student wishes to include in the views presented to the teacher.

In another embodiment, without taking a snapshot and while the input video stream is taking "live" video, the command interface may be configured to receive by the student verbal commands that indicate which views are to be presented to the professor.

In yet another embodiment, the view selection system may automatically generate and select bounding regions, and thus there may not be a need to use a command interface to generate and select bounding regions. As noted above, if a particular teacher and a particular student had a previous guitar lesson, the system restores the bounding region settings used in a previous meeting. Further, even if this particular teacher and this particular student are meeting via a video conference for the first time, the system's computer vision techniques may make a determination that both participants are holding guitars, and in response to such determination, the system may automatically implement bounding region generation and selection, e.g., to generate and select the first bounding region 340 and the second bounding region 350 shown in FIG. 3.

Additionally, as noted above, after the bounding regions are selected, a tracking subsystem, such as the automatic boundary detection/tracking logic 160, may be used to track one or more objects detected in the designated bounding regions, and such objects may be tracked or kept in focus throughout the entire meeting. As previously noted, objects in the bounding regions may be detected and tracked with any one of a variety of object tracking techniques, such as object tracking techniques that use one or more deep neural networks. In FIG. 3, if the guitarist 346 moves his or her head laterally, upward or downward, or closer to or farther from the camera, the head 342 of the guitarist 346 will still remain in the same general position in the first focused view 362, and the bounding region may alter size or shape to accommodate changes in size or shape of the tracked object(s) included in the corresponding designated bounding region. Further, the automatic boundary detection/tracking logic 160 may include object tracking techniques that are customized for the type of object or objects within the designated bounding region. Additionally, each focused view may be rendered to have higher resolution, e.g., using super-resolution approaches that may use one or more deep neural networks. As shown in FIG. 3, the second focused view 372 is an enlarged version of the second bounding region 350, and the second focused view 372 may have a higher resolution than the video frames included in the second bounding region 350.

While the embodiment shown in FIG. 3 pertains to an online guitar lesson between a teacher and student, the above-noted techniques may be applied to a variety of applications. As such, the above-noted techniques may be specifically optimized for a variety of objects or views over a wide range of applications. For example, views of a head, torso, hands, arms, feet, legs, body may be used in video conferenced performances, classes, or activities such as, e.g., yoga, dancing, soccer, gymnastics, and acting. Further, the views are not limited to those that involve specified body parts. In another embodiment, the above-noted techniques may be applied to generate views of particular members of a band, orchestra, etc. Further still, the above-noted techniques may be applied to industrial applications, e.g., in the instance of a worker servicing a machine while receiving guidance from another remote worker. In such an embodiment, exemplary views may include a view of the machine being serviced and a view of the head/torso of the worker.

Figure 4A:
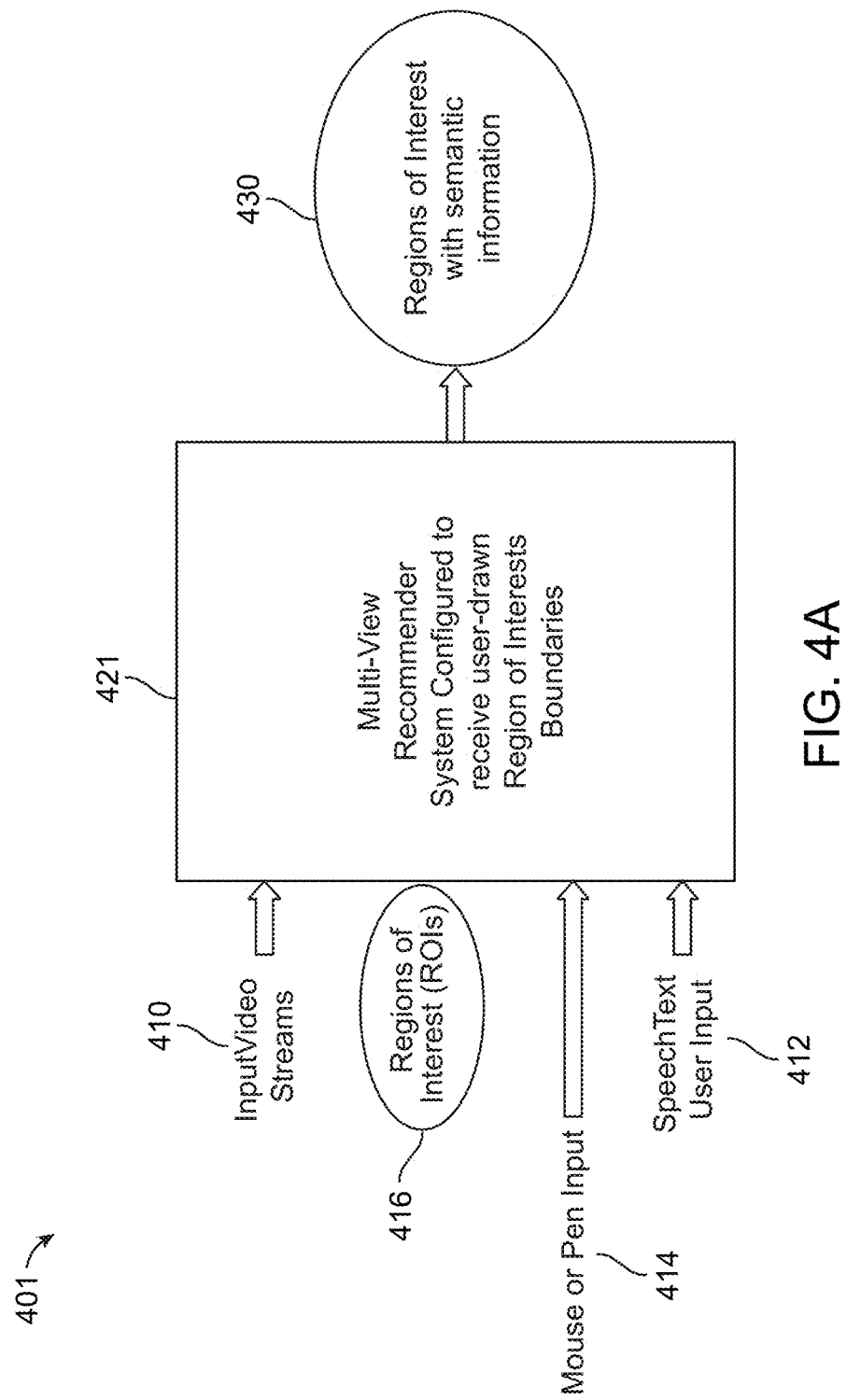
FIG. 4A is a block diagram of a multi-view recommender system configured to receive user-drawn boundaries of regions of interests, according to an example embodiment.
Figure 4B:
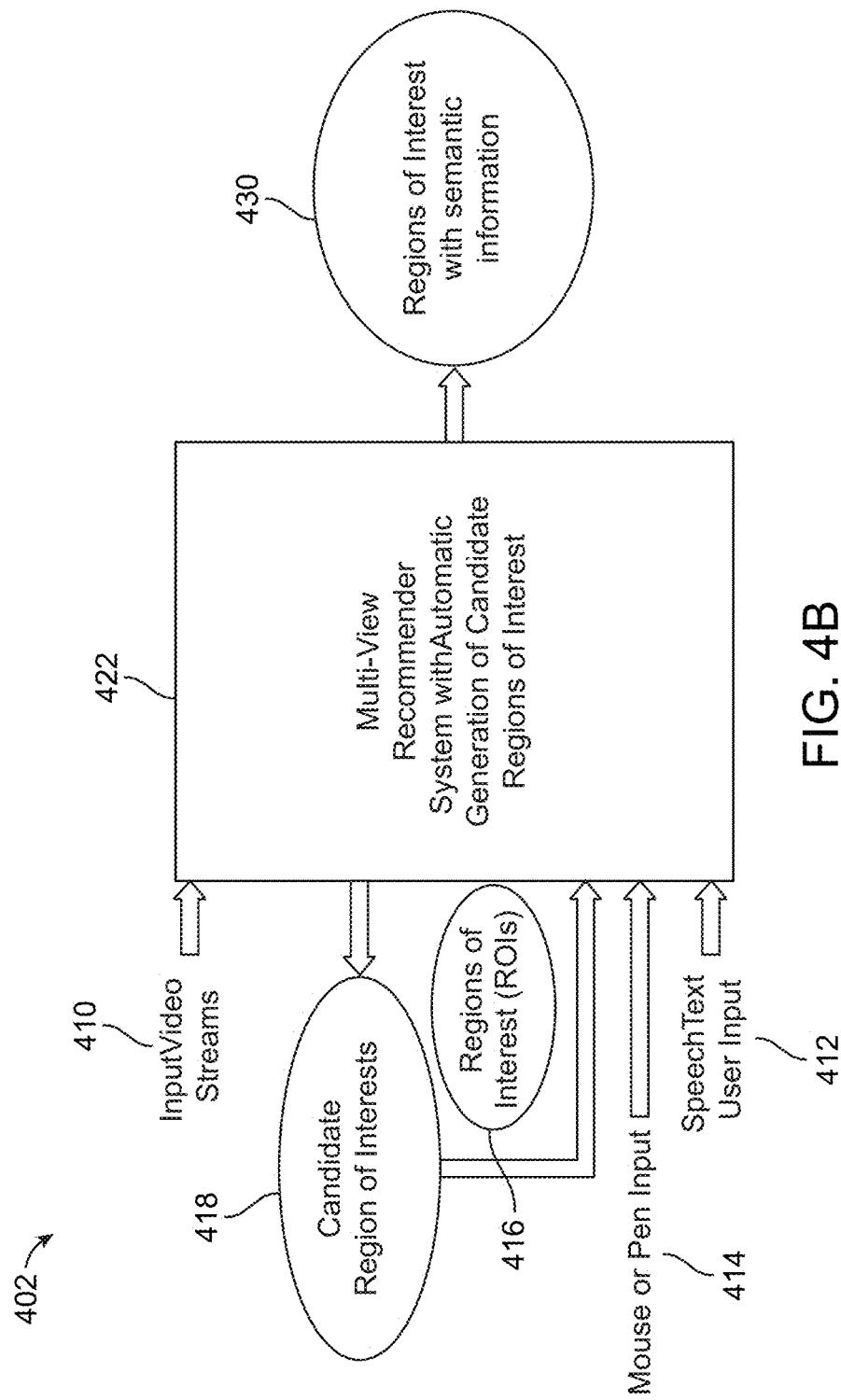
FIG. 4B is a block diagram of a multi-view recommender system configured to automatically generate candidate regions of interests, according to an example embodiment.
Figure 4C:
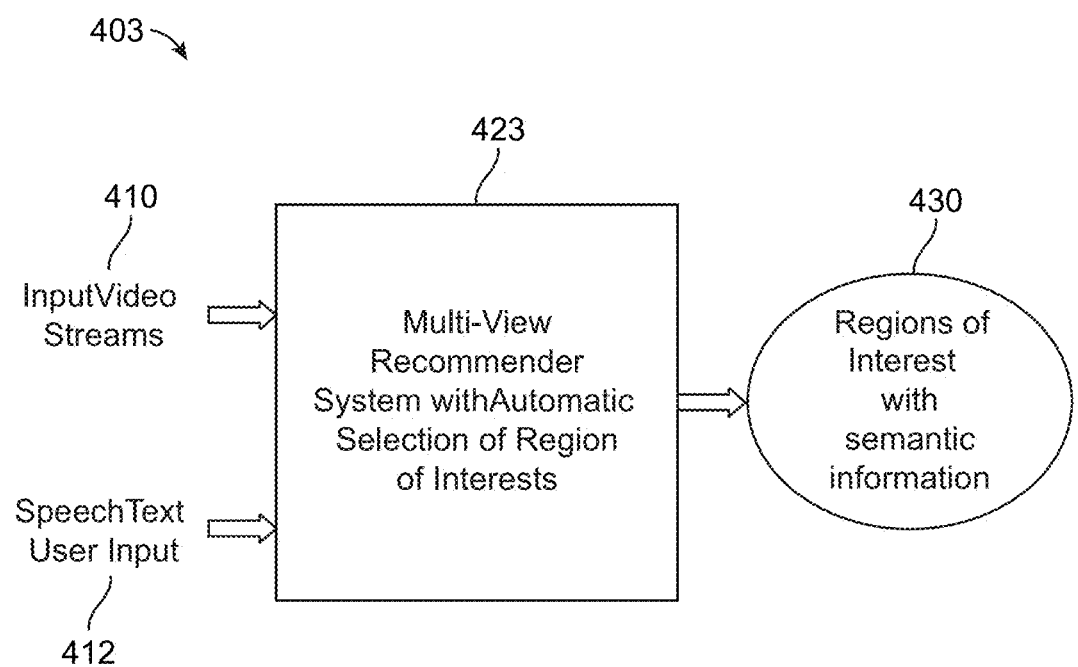
FIG. 4C is a block diagram of a multi-view recommender system configured to automatically generate and display regions of interests, according to another example embodiment.

Reference is now made to FIGS. 4A, 4B, and 4C. FIG. 4A is a block diagram of a first multi-view approach 401, in which a first MVRS 421 receives user drawn boundaries of regions of interests; FIG. 4B is a block diagram of a second multi-view approach 402, in which a second MVRS 422 automatically generates candidate regions of interests; and FIG. 4C is a block diagram of a third multi-view approach 403, in which a third MVRS 423 automatically generates and displays regions of interests.

The first MVRS 421, second MVRS 422, and third MVRS 423 may collectively referred to as "the first, second, and third MVRSs 421, 422, and 423." The first, second, and third MVRSs 421, 422, and 423 each may be configured to accept at least two inputs, i.e., one or more input video streams 410 and speech/text user input 412. Additionally, the first, second, and third MVRSs 421, 422, and 423 each may be configured to output regions of interest with semantic information 430, which may have associated semantic information. However, each of the first, second, and third MVRSs 421, 422, and 423 may use a different approach to generate such output. In particular, the first, second, and third MVRSs 421, 422, and 423 differ in their levels of user interaction and their levels of autonomy. Regardless of the provided level of user-assistance, the level of autonomy, and the level of user-interaction, the first, second, and third MVRSs 421, 422, and 423 each may be used to generate high-resolution multiple focused views from an input video stream.

Referring to FIG. 4A, the first MVRS 421 is now described, in which the user draws or otherwise provides regions of interest to the first MVRS 421. In addition to the input video streams 410 and speech/text user input 412, the first MVRS 421 may be configured to receive mouse or pen (or touchscreen) input 414, which a user may use to draw the bounding regions of the regions of interest 416. After drawing the bounding regions of the regions of interest 416, the user may provide user input data in the form of mouse or pen (or touchscreen) input 414 or speech/text user input 412 to identify the objects within the drawn bounding regions. The first MVRS 421 may store such object identifications as semantic meanings of the objects in the drawn bounding regions.

In FIG. 4B, the second MVRS 422 provides more user assistance, more autonomy and involves less user interaction as compared to the first MVRS 421. In one embodiment, the second MVRS 422 is configured to provide recommended regions of interest 418 to the user. For example, the second MVRS 422 may be configured to process the input video streams 410 using computer-vision models to first detect objects and then draw bounding regions around the detected objects, which are presented to the user as candidate regions of interest 418. These computer-vision models may use object-recognition modules, such as prebuilt common object recognition models. The second MVRS 422 may further use object models for a variety of themes associated with a variety of end-user applications, which may each have different visual contexts. Each theme may include a different composition of objects that the second MVRS 422 may use in object detection and candidate regions of interest suggestion.

The second MVRS 422 may further be configured to identify objects that are not included in a prebuilt common object recognition model. For example, the second MVRS 422 may use a saliency detection module that may execute a context-dependent saliency detection algorithm that detects regions of interest without resorting to target object models. As such, the second MVRS 422 may use context-aware saliency detection to detect and suggest an unrecognized object with a suggested bounding region around the unknown object. For example, the "context" may be hands, and it may be assumed that any unknown "object-like" blob attached to the hands could be an object of interest that the saliency detection process will detect.

In other words, after a computer-vision-based object recognition module having prebuilt common object recognition models detects an object and/or the saliency detection module detects an object that does not have a prebuilt object-recognition model, the second MVRS 422 may automatically generate candidate regions of interest 418 for such objects, and the second MVRS 422 may be configured to receive user input in the form of mouse or pen (or touchscreen) input 414 or speech/text user input 412, which indicates which of the candidate regions of interest 418 are to be used for the focused views.

The second MVRS 422 may further include a natural language processing module to extract a semantic meaning of the audio/text input data, and the second MVRS 422 may associate such audio/text input data with a theme or with the computer-vision models of the second MVRS 422. As such, the second MVRS 422 may output regions of interest with semantic information 430, which may be used to generate a multi-view focused video stream. In one embodiment, the second MVRS 422 also provides all of the functions of the first MVRS 421, e.g., an ability for a user to manually draw bounding regions for regions of interest 416. This may be advantageous if the candidate regions of interest 418 do not include an object of interest. As such, the second MVRS 422 may be configured to receive user input to draw the bounding regions of the regions of interest 416, and may input the user-drawn bounding regions of the regions of interest 416 into the computer-vision models to improve the modes when, in the future, generating candidate regions of interest 418.

In FIG. 4C, the third MVRS 423, as compared to the first MVRS 421 and second MVRS 422, provides the most user assistance, has the most autonomy, and involves the least user interaction. In one embodiment, the third MVRS 423 is configured to automatically generate regions of interest and automatically select regions of interest that the third MVRS 423 determines are most appropriate based on the available user inputs, which may be multi-modal. In one embodiment, the third MVRS 423 includes computer-vision-based object recognition modules having prebuilt common object recognition models to detect and select objects in the input video streams 410. In one embodiment, the computer-vision-based object recognition models of the third MVRS 423 may use information from previous online meeting sessions to make determinations as to which objects should be included in the regions of interest with semantic information 430. For example, if a computer-vision-based object recognition model detects objects that are similar to those detected in a previous meeting session, the third MVRS 423 may automatically select regions of interest for the objects previously included in regions of interest of the previous meeting session. Further, the third MVRS 423 may use computer vision technique(s), machine learning, neural network(s), or artificial intelligence technique(s), alone or in combination, to select the most appropriate bounding regions or regions of interest based on the objects detected in the input video streams 410. In one embodiment, the third MVRS 423 is configured to accept user input data in the form of speech, text, mouse, pen, or touchscreen user input data, and in one embodiment, the user input data may be used to confirm or deny whether the regions of interest automatically generated/selected by the third MVRS 423 correspond to the regions of interest desired by the user. This user input data, with confirmations or denials, may further be input into the MVRS 423 to improve the computer vision model(s) in future automatic selection of regions of interest.

In any case, the first, second, and third MVRSs 421, 422, and 423 may be configured to extract semantic information from the regions of interest, and the semantic information may include, e.g., object types, motion pattern types, correlation between regions of interest, and a confidence estimate of each region of interest. The extracted semantic information may be fed into a video super-resolution system at the receiver module 240 (as shown in FIG. 2), which may use a variety of models to appropriately address a variety of interpolation schemes for different types of regions of interest having different object types and different motion patterns.

Figure 5:
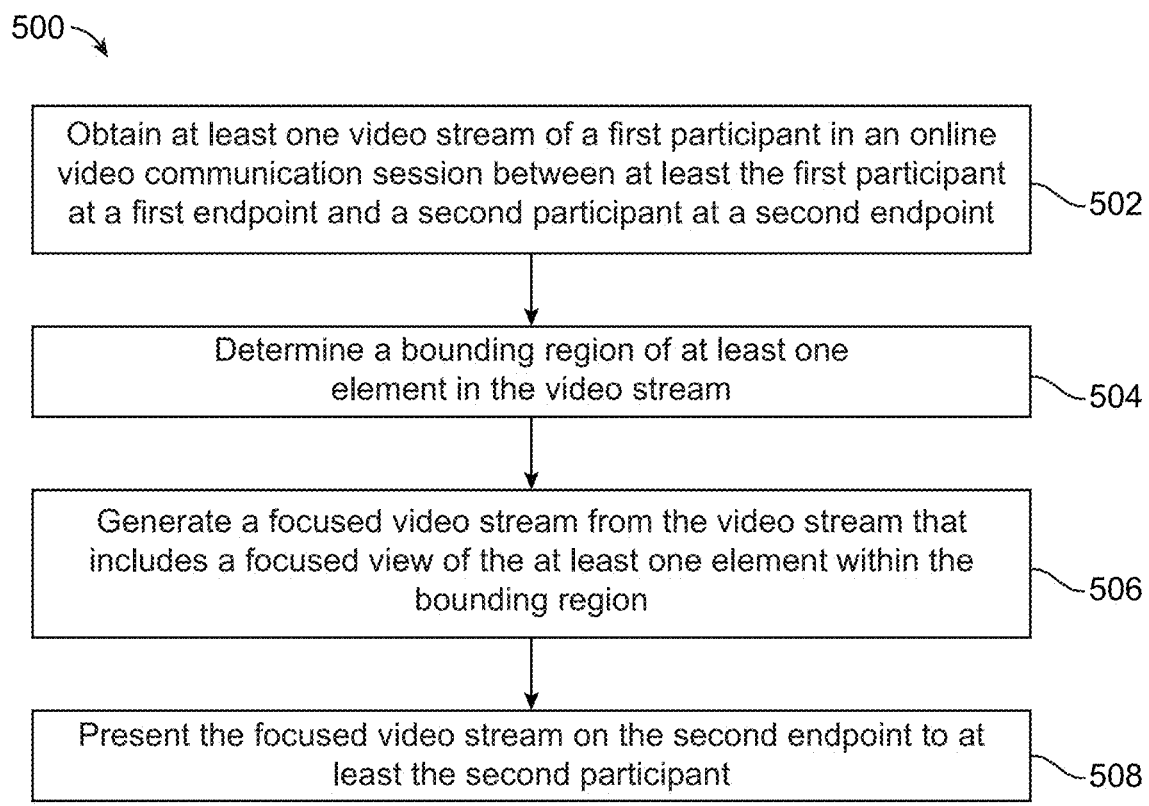
FIG. 5 is a flowchart illustrating a method for generating a multi-view focused video stream, according to an example embodiment.

Referring to FIG. 5, FIG. 5 is a flowchart illustrating a method 500 for generating a multi-view focused video stream, according to an example embodiment. At 502, the method 500 involves obtaining at least one video stream of a first participant in an online video communication session between at least the first participant at a first endpoint and a second participant at a second endpoint. At 504, the method 500 involves determining a bounding region of at least one element in the video stream. At 506, the method 500 involves generating a focused video stream from the video stream that includes a focused view of the at least one element within the bounding region. And at 508, the method 500 involves presenting the focused video stream on the second endpoint to at least the second participant.

Figure 6:
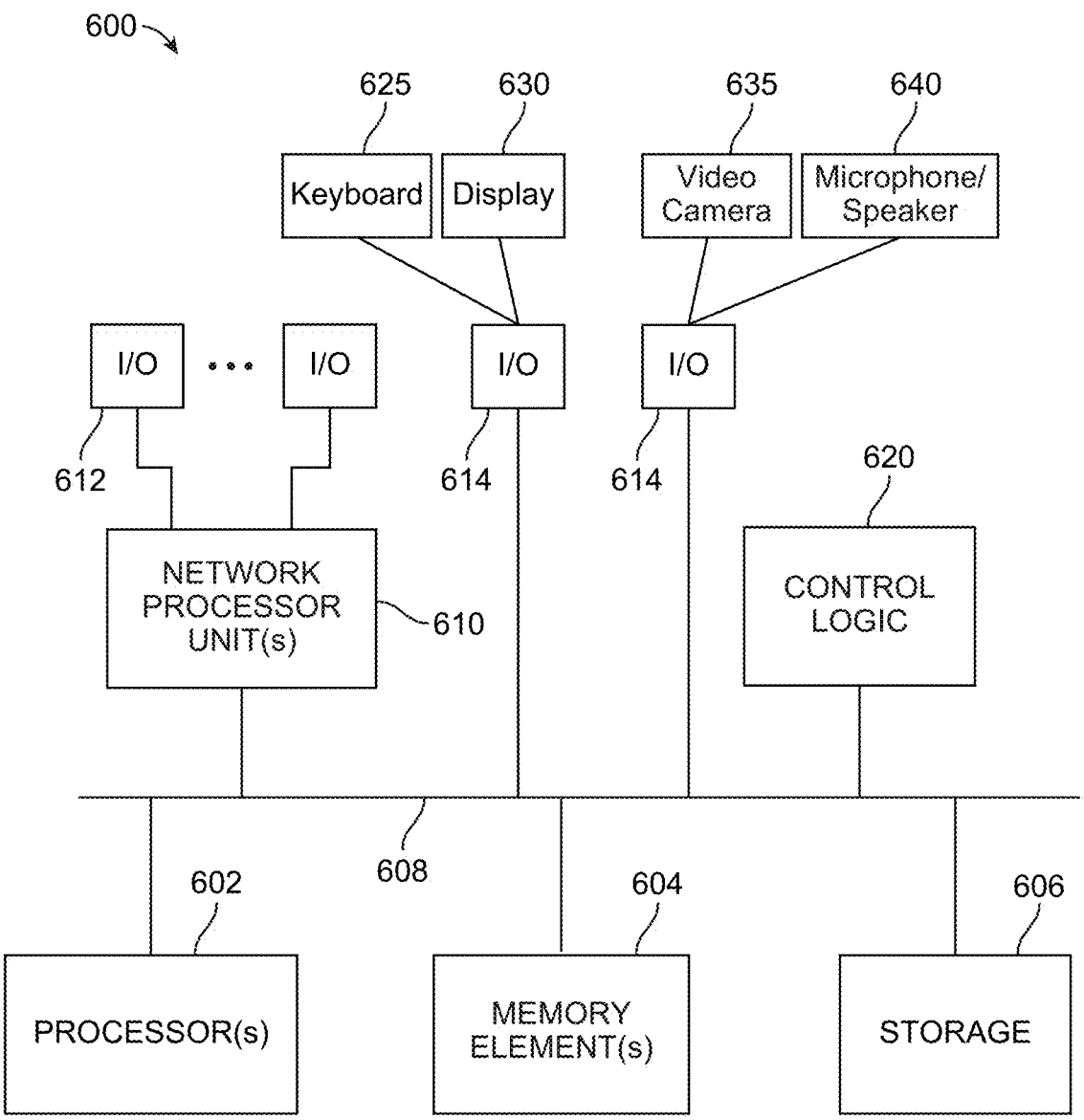
FIG. 6 is a hardware block diagram of a computer device that may be configured to perform the user device based operations involved in generating a multi-view focused video stream, according to an example embodiment.

Referring to FIG. 6, FIG. 6 illustrates a hardware block diagram of a computing/computer device 600 that may perform functions of a user device associated with operations discussed herein in connection with the techniques depicted in FIGS. 1-5. In various embodiments, a computing device, such as computing device 600 or any combination of computing devices 600, may be configured as any form of a user device as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard 625, keypad, a touch screen, and/or any other suitable input and/or output device now known or hereafter developed. This may be the case, in particular, when the computer device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 630 shown in FIG. 6, particularly when the computer device 600 serves as a user device as described herein. Display 630 may have touch-screen display capabilities. Additional external devices may include a video camera 635 and microphone/speaker combination 640. While FIG. 6 shows the display 630, video camera 635 and microphone/speaker combination 640 as being coupled via I/O interfaces 614, it is to be understood that these may be external/peripheral components that instead may be coupled to the bus 608.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 7:
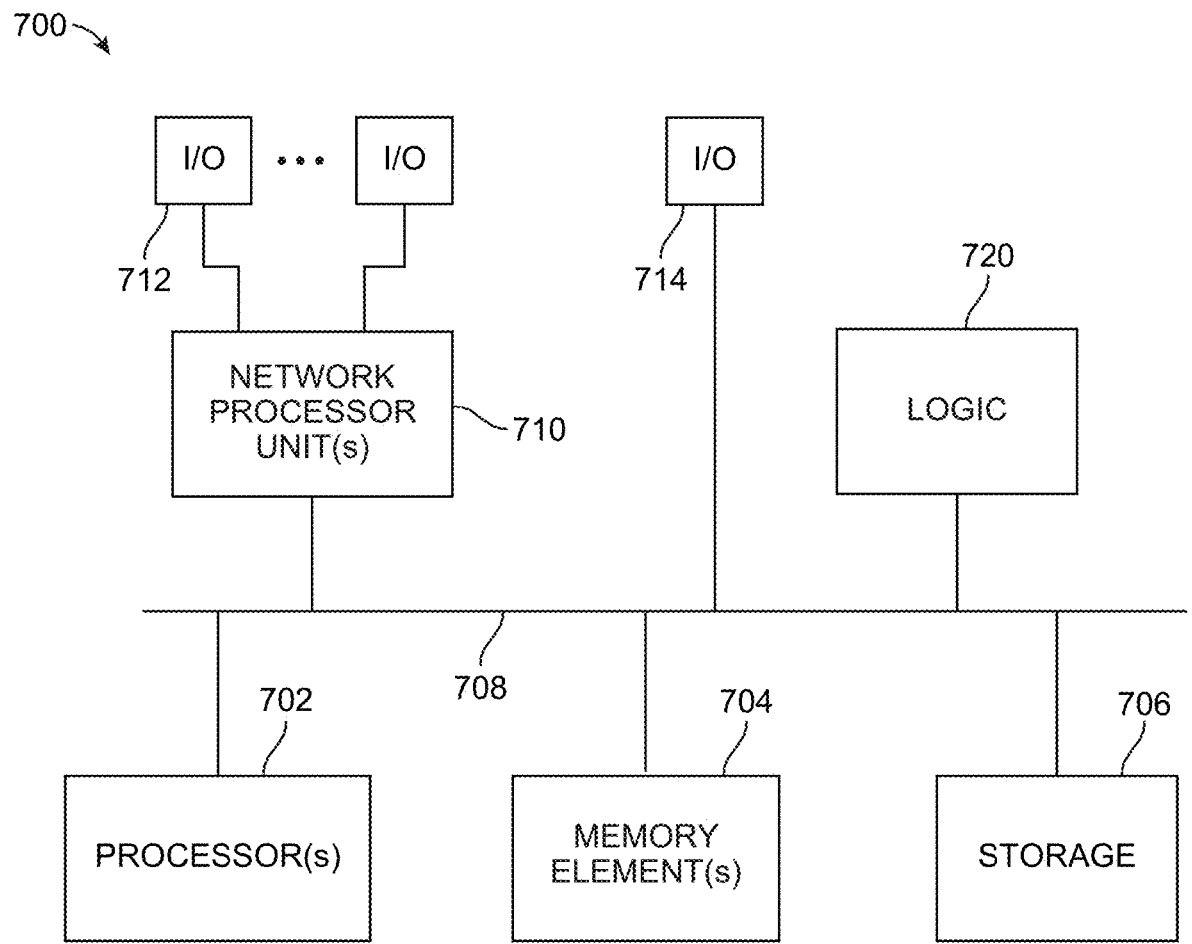
FIG. 7 is a hardware diagram of a computing device that may be configured to perform the meeting server operations involved in generating a multi-view focused video stream, according to an example embodiment.

FIG. 7 illustrates a block diagram of a computing device 700 that may perform the functions of the meeting server(s) 110 described herein. The computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and meeting server logic 720. In various embodiments, instructions associated with the meeting server logic 720 is configured to perform the meeting server operations described herein.

In one form, a method is provided comprising obtaining a video stream (at least one video stream) of a first participant in an online video communication session between at least the first participant at a first endpoint and a second participant at a second endpoint; determining a bounding region of at least one element in the video stream; generating a focused video stream from the video stream that includes a focused view of the at least one element within the bounding region; and presenting the focused video stream on the second endpoint to at least the second participant.

In one example, the method may include generating an enlarged view of the bounding region that includes the at least one element. In another example, the method may include receiving user input that is used for determining the bounding region, and the user input may be at least one of: a voice command from the first participant or from the second participant, interaction with a user interface screen on which a snapshot of an entire view is taken to draw the bounding region, or responses from the first participant or the second participant to automatically generated recommendations of the bounding region. In another example, the method may include tracking the at least one element within the video stream over time; and modifying contours of the bounding region to keep focus on the at least one element within the video stream over time.

In another example, the method may include using computer vision techniques, a machine learning algorithm, and/or neural network techniques to detect the at least one element, determine the bounding region of the at least one element, and track the at least one element in the video stream over time. In another example, the method may include storing view selection preferences from communication sessions for use in a future communication session in determining the bounding region and generating the focused video stream.

In another example, the method may include determining a first bounding region of a first element in the video stream; determining a second bounding region of a second element in the video stream; generating a first focused video stream from the video stream that provides a first focused view of the first element within the first bounding region; generating a second focused video stream from the video stream that provides a second focused view of the second element within the second bounding region; and presenting the first and second focused video streams to at least the second participant.

In another example, the method may include generating an enlarged view of the first element within the first bounding region and/or generating an enlarged view of the second element within the second bounding region. In another example, the method may include enhancing a resolution of the first focused video stream and the second focused video stream using a resolution enhancing algorithm. In another example, the method may include performing the determination of the bounding region and/or the generation of the focused video stream at the first endpoint, at the second endpoint, or at a meeting server that is in communication with the first endpoint and the second endpoint.

In another form an apparatus is provided comprising a memory; a network interface configured to enable network communication; and a processor, wherein the processor is configured to perform operations including: obtaining a video stream (at least one video stream) of a first participant in an online video communication session between at least the first participant at a first endpoint and a second participant at a second endpoint; determining a bounding region of at least one element in the video stream; generating a focused video stream from the video stream that includes a focused view of the at least one element within the bounding region; and presenting the focused video stream on the second endpoint to at least the second participant.

In still another form, one or more non-transitory computer readable storage media encoded with instructions are provided that, when executed by a processor, cause the processor to execute a method including: obtaining a video stream (at least one video stream) of a first participant in an online video communication session between at least the first participant at a first endpoint and a second participant at a second endpoint; determining a bounding region of at least one element in the video stream; generating a focused video stream from the video stream that includes a focused view of the at least one element within the bounding region; and presenting the focused video stream on the second endpoint to at least the second participant.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as "messages," "messaging," "signaling," "data," "content," "objects," "requests," "queries," "responses," "replies," etc. which may be inclusive of packets. As referred to herein and in the claims, the term "packet" may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a "payload," "data payload," and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of," "one or more of," "and/or," variations thereof, or the like are open-ended expressions that are both conjunctive and disjunctive in operation for any and all possible combination of the associated listed items. For example, each of the expressions "at least one of X, Y and Z," "at least one of X, Y or Z," "one or more of X, Y and Z," "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first," "second," "third," etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a video stream of a first participant in an online video communication session between at least the first participant at a first endpoint and a second participant at a second endpoint;
   retrieving view selection preferences from at least one previous communication session;
   determining a bounding region of at least one element in the video stream based on the view selection preferences;
   generating a focused video stream from the video stream that includes a focused view of the at least one element within the bounding region based on the view selection preferences; and
   presenting the focused video stream on the second endpoint to at least the second participant.

2. The method of claim 1, wherein the generating the focused video stream comprises:
   generating an enlarged view of the bounding region that includes the at least one element.

3. The method of claim 1, further comprising:
   receiving user input that is used for determining the bounding region, wherein the user input is at least one of:
   a voice command from the first participant or from the second participant,
   interaction with a user interface screen on which a snapshot of an entire view is taken to draw the bounding region, or
   responses from the first participant or the second participant to automatically generated recommendations of the bounding region.

4. The method of claim 1, further comprising:
   tracking the at least one element within the video stream over time; and
   modifying contours of the bounding region to keep focus on the at least one element within the video stream over time.

5. The method of claim 4, further comprising:
   using computer vision techniques, a machine learning algorithm or neural network techniques to detect the at least one element, determine the bounding region of the at least one element, and track the at least one element in the video stream over time.

6. The method of claim 1, further comprising:
   storing the view selection preferences for use in a future communication session in determining the bounding region and generating the focused video stream.

7. The method of claim 1, further comprising:
   determining a first bounding region of a first element in the video stream;
   determining a second bounding region of a second element in the video stream;
   generating a first focused video stream from the video stream that provides a first focused view of the first element within the first bounding region;
   generating a second focused video stream from the video stream that provides a second focused view of the second element within the second bounding region; and
   presenting the first and second focused video streams to at least the second participant.

8. The method of claim 7, wherein the generating the first focused video stream comprises generating an enlarged view of the first element within the first bounding region, and wherein generating the second focused video stream comprises generating an enlarged view of the second element within the second bounding region.

9. The method of claim 7, further comprising:
   enhancing a resolution of the first focused video stream and the second focused video stream.

10. The method of claim 1, wherein:
    the determining and generating are performed at the first endpoint, at the second endpoint, or at a meeting server that is in communication with the first endpoint and the second endpoint.

11. An apparatus comprising:
a memory;
a network interface configured to enable network communication; and
a processor, wherein the processor is configured to perform operations comprising:
obtaining a video stream of a first participant in an online video communication session between at least the first participant at a first endpoint and a second participant at a second endpoint;
retrieving view selection preferences from at least one previous communication session;
determining a bounding region of at least one element in the video stream based on the view selection preferences;
generating a focused video stream from the video stream that includes a focused view of the at least one element within the bounding region based on the view selection preferences; and
presenting the focused video stream on the second endpoint to at least the second participant.

12. The apparatus of claim 11, wherein the processor is configured to perform the generating the focused video stream by:
generating an enlarged view of the bounding region that includes the at least one element.

13. The apparatus of claim 11, wherein the processor is further configured to perform operations comprising:
receiving user input that is used for determining the bounding region, wherein the user input is at least one of:
a voice command from the first participant or from the second participant,
interaction with a user interface screen on which a snapshot of an entire view is taken to draw the bounding region, or
responses from the first participant or the second participant to automatically generated recommendations of the bounding region.

14. The apparatus of claim 11, wherein the processor is further configured to perform operations comprising:
tracking the at least one element within the video stream over time; and
modifying contours of the bounding region to keep focus on the at least one element within the video stream over time.

15. The apparatus of claim 14, wherein the processor is further configured to perform operations comprising:
using computer vision techniques, a machine learning algorithm or neural network techniques to detect the at least one element, determine the bounding region of the at least one element, and track the at least one element in the video stream over time.

16. The apparatus of claim 11, wherein the processor is further configured to perform operations comprising:
storing the view selection preferences for use in a future communication session in determining the bounding region and generating the focused video stream.

17. One or more non-transitory computer readable storage media encoded with instructions that, when executed by a processor, cause the processor to execute a method comprising:
obtaining a video stream of a first participant in an online video communication session between at least the first participant at a first endpoint and a second participant at a second endpoint;
retrieving view selection preferences from at least one previous communication session;
determining a bounding region of at least one element in the video stream based on the view selection preferences;
generating a focused video stream from the video stream that includes a focused view of the at least one element within the bounding region based on the view selection preferences; and
presenting the focused video stream on the second endpoint to at least the second participant.

18. The one or more non-transitory computer readable storage media of claim 17, wherein the generating the focused video stream comprises:
generating an enlarged view of the bounding region that includes the at least one element.

19. The one or more non-transitory computer readable storage media of claim 17, wherein when the processor executes the instructions, the processor is further caused to perform operations comprising:
receiving user input that is used for determining the bounding region, wherein the user input is at least one of:
a voice command from the first participant or from the second participant,
interaction with a user interface screen on which a snapshot of an entire view is taken to draw the bounding region, or
responses from the first participant or the second participant to automatically generated recommendations of the bounding region.

20. The one or more non-transitory computer readable storage media of claim 17, wherein when the processor executes the instructions, the processor is further caused to perform operations comprising:
tracking the at least one element within the video stream over time; and
modifying contours of the bounding region to keep focus on the at least one element within the video stream over time.

* * * * *